United States Patent

[11] 3,616,284

[72] Inventors Max G. Bodmer
Short Hills;
Merton H. Crowell, Morristown; Norman C. Wittwer, Jr., Oldwick, all of N.J.
[21] Appl. No. 754,183
[22] Filed Aug. 21, 1968
[45] Patented Oct. 26, 1971
[73] Assignee Bell Telephone Laboratories, Incorporated
Murray Hill, Berkeley Heights, N.J.

[54] PROCESSING ARRAYS OF JUNCTION DEVICES
5 Claims, 1 Drawing Fig.

[52] U.S. Cl. .......... 204/16, 204/15
[51] Int. Cl. .......... C23b 5/48, C23b 7/00
[50] Field of Search .......... 204/16, 195, 1.1, 181, 42

[56] References Cited

UNITED STATES PATENTS

| | | | |
|---|---|---|---|
| 2,909,470 | 10/1959 | Schmidt | 204/14 |
| 3,345,274 | 10/1967 | Schmidt | 204/15 |
| 3,379,625 | 4/1968 | Csabi | 204/1 |
| 3,408,274 | 10/1968 | Hoffman | 204/140 |
| 2,578,400 | 12/1951 | Cohn | 204/42 |
| 2,875,384 | 2/1959 | Wallmark | 204/42 |
| 3,324,015 | 6/1967 | Saia et al. | 204/15 |
| 3,403,284 | 9/1968 | Buck et al. | 315/11 |
| 3,466,230 | 9/1969 | Carithers | 204/42 |

FOREIGN PATENTS

| | | | |
|---|---|---|---|
| 644,887 | 10/1950 | Great Britain | |

*Primary Examiner*—John H. Mack
*Assistant Examiner*—T. Tufariello
*Attorneys*—R. J. Guenther and Arthur J. Torsiglieri

ABSTRACT: The specification describes a method for processing junction or barrier layer arrays to eliminate leakage defects. The array is anodized under mild electrolytic conditions which reverse bias the diodes. Since the array is reverse biased, anodization occurs selectively at the sites of current leakage and in proportion to the amount of leakage until the leakage is effectively eliminated. Properly formed elements of the array are essentially unaffected.

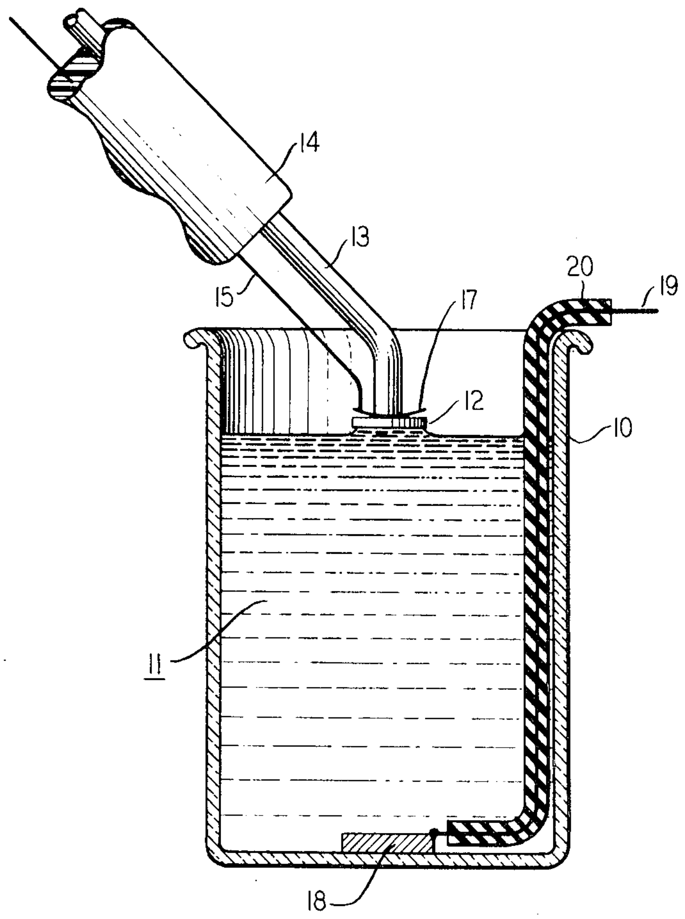
INVENTORS M. G. BODMER
M. H. CROWELL
N. C. WITTWER, JR
BY [signature]
ATTORNEY

PROCESSING ARRAYS OF JUNCTION DEVICES

This invention relates to improved storage tubes for optical information and to methods for their manufacture.

The image storage tube recently discovered and described and claimed in U.S. Pat. application Ser. No. 605,715, filed Dec. 29, 1966, by T. M. Buck, M. H. Cromwell and E. I. Gordon and assigned to the assignee of this invention, Bell Telephone Laboratories, Incorporated, and now U.S. Pat. No. 3,403,284, and related application, Ser. No. 641,257, filed May 25, 1967 by M. H. Crowell, J. V. Dalton, E. I. Gordon and E. F. Labuda also assigned to Bell Telephone Laboratories, Incorporated, and now Pat. No. 3,451,449, has received wide acclaim as an important technological advance and it will likely be of considerable commercial interest for several years. The device relies on a target structure which contains an array of semiconductor diodes as charge storage elements. The monolithic nature of the diode array is important to the proper operation of the device. Obviously, if the electrical characteristics of individual diodes are significantly different, their response in the absence of illumination or to a given light signal will be nonuniform and the quality of the reconstructed image will suffer. Whereas in actual practice a properly processed diode array has remarkably uniform and reproducible light response, target defects due to excessive leakage currents at individual diodes do arise. These defects produce bright spots which appear as if that element of the target is continuously illuminated. Rather than reject defective arrays during manufacture it would be economically desirable to repair the defective diodes. This invention is directed to a method for repairing or healing such defects.

According to the invention diodes exhibiting excess current leakage are treated to reduce the leakage while the properly functioning diodes remain unaffected. This objective is accomplished by anodically oxidizing the target. With the target at anode potential the diodes are reverse biased and essentially no anodizing current flows through the properly formed diodes. However, oxidation will occur preferentially on those diodes exhibiting current leakage, in proportion to the amount of leakage.

This technique is effective in healing or repairing defects in the sense that the regions of current leakage or "bright" spots are eliminated. However, it will be recognized that the defective diodes which behave as shorted elements are not repaired or healed but are merely rendered inoperative. The diodes which exhibit excessive leakage currents will appear to be healed since their dark currents at a given target voltage will be reduced to a normal level. These repaired diodes will function as active target elements.

This selective-coating process for eliminating shorted diodes from a diode array and for healing diodes excessive leakage currents is considered unique and likely will find other applications. For instance, in processing arrays of diodes or transistors for memory and logic functions this technique can be used to eliminate defective units from the array. Since the shorted unit after processing does not conduct in either the forward or reverse current direction, its presence in the array can be ignored. The array can also be treated so that all units have approximately uniform resistance levels at some reference voltage. Transistors may be processed by this technique and either or both junctions treated. If it is necessary to locate a defective junction this can conveniently be done by detecting abnormal or absent forward bias conduction.

In homogeneities in a junction array caused by gross differences in the sensitivity of the diodes, i.e., the electrical response of the diode for a given incident photon density, can also be treated by the method of this invention. This is accomplished by exposing the array to a constant photon flux while simultaneously anodizing the array under mild electrolytic conditions. This treatment equalizes the threshold response so that at the maximum incident light intensity each diode will exhibit approximately equal current output and the image will have uniform brightness.

These and other aspects of the invention are set forth more fully in the following detailed description. In the drawing:

The FIGURE is a perspective view of an electrolytic cell suitable for processing arrays in accordance with this invention.

The apparatus of the FIGURE shows a beaker 10 filled with electrolyte 11. The workpiece 12, which in this case is a silicon wafer with the diode array face down, is held in place at the surface of the electrolyte by a vacuum chuck 13. The chuck is connected to a vacuum hose 14 and is supported by means not shown. The anode connection is made through wire 15 which is supported by the insulating hose with the aid of clamp 16 and soldered to a contact tab 17 which makes anodic contact to the workpiece. The cathode 18 is disposed within the electrolyte and is connected to a power source through wire 19 provided with Teflon insulation 20 as shown.

The target may be processed in accordance with the following exemplary procedure.

The target consists of an array of P-type diffused diodes produced by boron diffusion through windows in a 6,000 A.$SiO_2$ coating over the N-type silicon substrate. The back of the wafer is exposed silicon in order to make contact with tab 17. Good electrical contact can be ensured by coating the silicon wafer with silver paint.

The electrolyte in this example was 2.2 grams of $KNO_2$ in 100 milliliters of tetrahydrofurfuryl alcohol. The electrolyte is not considered a part of the invention as this aspect of the anodization is conventional and various other anodizing solutions can be used. To achieve the meniscus shown in the FIGURE the wafer, held by the vacuum chuck, is brought into physical contact with the electrolyte. After the surface is wet the wafer can be withdrawn perhaps one-sixteenth of an inch while supporting that column of liquid beneath it. By supporting the wafer in this manner unwanted anodization of the obverse or bare side of the silicon is minimized.

Good anodizing results were obtained by applying a time increasing voltage to the anode, e.g., 4 volts to 35 volts in 35 seconds. Applying a ramp voltage rather than a voltage step precludes excessive local power dissipation and thus avoids sparking and evolution of molecular oxygen which diminish the anodization efficiency. However, step voltages of from 3 volts to well over 100 volts were found adequate with some compromise in control and with a reduced anodizing efficiency at the higher voltages in this range, The anodizing time is highly variable but a minimum of a few seconds is adequate to effect significant results. It was found that the anodization for a given applied voltage was in many cases over 75 percent complete after 10 seconds and was significant after only 2 or 3 seconds. It may be found expedient to apply a voltage higher than that which corresponds to the ultimate treatment desired and then cease the anodization after partial completion. There is no apparent disadvantage in continuing the treatment past completion as the anodization at a given voltage is self terminating.

Targets processed in this manner are essentially devoid of bright spot defects.

According to another embodiment of the invention the targets are processed in two stages. The first stage is designed to produce a uniform level of bright light response as discussed above. The target is uniformly exposed to light and subjected to a mild anodization treatment while in this condition. Each diode will be anodized in accordance with its photon induced conduction until all diodes produce approximately equal response. This can be achieved for instance by exposing the target to white light of medium to high intensity (corresponding with medium to maximum current output) and raising the voltage to from 3 to 10 volts. The appropriate treatment time is approximately the same as that described above. The second stage is intended to minimize gross defects and is carried out as before by applying the voltage with the target in the dark.

What is claimed is:

1. A method for manufacturing a silicon diode array target for a video camera tube to reduce inhomogeneities in the photon induced electrical response between the several diodes which comprises the steps of:

forming an insulating coating on an N-type silicon substrate;
forming an array of windows through the insulating coating;
diffusing a P-type impurity through said windows into the substrate to form an array of diodes; and
anodizing the resulting diode array in the absence of light in an anodizing electrolyte.

2. The method of claim 1 wherein as an additional step the array is also mildly anodized in the presence of light.

3. The method of claim 1 wherein a potential is applied as a ramp voltage from approximately 5 volts to approximately 35 volts over a period of the order of 35 seconds.

4. The method of claim 1 wherein the anodizing electrolyte comprises $KNO_2$ in tetrahydrofurfuryl alcohol.

5. The method of claim 2 wherein the mild anodization involves the application of a voltage of from 3 to 10 volts for a period of at least a few seconds.

* * * * *